United States Patent [19]

Watanabe et al.

[11] Patent Number: 5,597,512
[45] Date of Patent: Jan. 28, 1997

[54] METHOD FOR PREPARING ELONGATED-SHAPED SILICA SOL

[75] Inventors: Yoshitane Watanabe; Yoshiyuki Kashima; Hiroyuki Takagi, all of Funabashi, Japan

[73] Assignee: Nissan Chemical Industries, Ltd., Tokyo, Japan

[21] Appl. No.: 323,119

[22] Filed: Oct. 14, 1994

[30] Foreign Application Priority Data

Oct. 15, 1993 [JP] Japan .................. 5-280703

[51] Int. Cl.$^6$ ...................................... B01J 13/00
[52] U.S. Cl. .................... 252/315.6; 252/313.1; 252/313.2; 106/287.34; 423/335
[58] Field of Search .......... 423/335; 252/313.1, 252/313.2, 315.6; 106/287.34

[56] References Cited

U.S. PATENT DOCUMENTS

| | | | |
|---|---|---|---|
| 2,244,325 | 6/1941 | Bird | 252/313.2 |
| 2,657,183 | 10/1953 | Bechtold | 252/313.2 |
| 2,680,721 | 6/1954 | Broge et al. | 252/313.2 |
| 2,757,073 | 7/1956 | Drexel | 252/313.2 |
| 2,892,797 | 6/1959 | Alexander et al. | 252/313.2 |
| 2,900,348 | 8/1959 | Ahlberg et al. | 252/313.2 |
| 3,351,561 | 11/1967 | Albrecht et al. | 252/309 |
| 3,948,799 | 4/1976 | Schaefer et al. | 106/287.34 |
| 4,343,717 | 8/1982 | Lok | 252/313.2 |
| 5,221,497 | 6/1993 | Watanabe et al. | 252/313.2 |

FOREIGN PATENT DOCUMENTS

| | | |
|---|---|---|
| 1-317115 | 12/1989 | Japan . |
| 4-65314 | 3/1992 | Japan . |
| 4-187512 | 7/1992 | Japan . |

OTHER PUBLICATIONS

"Particle Growth in Silica Dispersion", Ogino et al., *Journal of Colloid and Interface Science*, V. 56, No. 3, Sep. 1976, pp. 629–630.

"Analysis of Macromolecular Polydispersity", Koppel, *Journal of Chemical Physics*, V. 57, No. 11, Dec. 1972, pp. 4814–4820.

*Primary Examiner*—Michael Lewis
*Assistant Examiner*—Stuart L. Hendrickson
*Attorney, Agent, or Firm*—Oliff & Berridge

[57] ABSTRACT

A method for preparing a silica sol having an elongated shape comprising a step (a) where an aqueous solution containing a water-soluble calcium salt or a water-soluble magnesium salt or a mixture of the water-soluble calcium salt or the water-soluble magnesium salt is mixed with an aqueous colloidal solution of an active silicic acid; a step (b) where an alkaline substance is mixed with the aqueous liquid obtained in the step (a); a step (c) where a part or the whole of the mixture obtained in the step (b) is heated at 60° C. or higher to obtain a heel solution and a feed solution is prepared by a part of the mixture obtained in the step (b) or a mixture separately prepared by the step (b) and the feed solution is added to the heel solution; and a step where water is evaporated during said addition step so that SiO$_2$ concentration is concentrated to 6 to 30% by weight.

16 Claims, 1 Drawing Sheet

100nm

METHOD FOR PREPARING ELONGATED-SHAPED SILICA SOL

BACKGROUND OF THE INVENTION

1. Field of the Invention

The present invention relates to a method for preparing elongated-shaped silica sol. More specifically, the silica sol prepared by the method of the present invention is characterized by a particular shape of colloidal silica particle and displays an excellent filming or coating property after being coated and dried on a solid article and therefore it is utilized as a coating composition and in other various fields.

The method according to the present invention prepares the silica sol at high efficiency.

2. Description of Related Prior Art

A known process for producing elongated-shaped silica sol particles is disclosed in JP-A-1-317115 (corresponding to U.S. Pat. No. 5,221,497). The method provides a stable aqueous alkaline silica sol having $SiO_2$ concentration of 1 to 6% by weight, and it comprises mixing an aqueous solution containing a water-soluble calcium salt or magnesium salt or a mixture of the calcium salt and the magnesium salt with an aqueous colloidal liquid of active silicic acid containing from 1 to 6% by weight of $SiO_2$ concentration, and further mixing an alkali metal hydroxide or a water-soluble organic base or a water-soluble silicate of said alkali metal hydroxide or said water-soluble organic base with the mixed solution at a molar ratio of $SiO_2/M_2O$ of from 20 to 300 (where $SiO_2$ represents the total amount of the silica content derived from said active silicic acid and the silica content of said silicate and M represents an alkali metal atom or a molecule of said organic base) and heating the resulting mixture in the temperature range of from 60° to 300° C. for a duration of from 0.5 to 40 hours.

In the process for producing elongated-shaped silica sol particles as disclosed in JP-A-1-317115, however, the colloidal silica particles are bonded and grown by heating them under a condition that water is hardly evaporated. Thus, the resulting silica sol contains $SiO_2$ in a concentration range of from 1 to 6% by weight. The silica sol obtained as a result is generally concentrated thereafter to a $SiO_2$ concentration range of from 5 to 30% by weight. In the concentration-step, a higher concentration of $SiO_2$ before the concentration-step allows more efficient production of highly concentrated silica sol as a final product. However, where the $SiO_2$ concentration of silica sol is in the range of from 1 to 6% by weight, the efficiency drops because much time and energy are consumed in the concentration-step.

SUMMARY OF THE INVENTION

In the light of aforementioned circumstances, an object of the present invention is to provide a method for efficiently preparing an enlongated-shaped silica sol with high $SiO_2$ concentration by simultaneously evaporating water during the step of bonding and growing the colloid particles.

As one example of the present invention, a stable aqueous alkaline silica sol having $SiO_2$ concentration of 6 to 30% by weight and having elongated-shaped amorphous colloidal silica particles each having 5 or more as a ratio of $D_1/D_2$ where $D_1$ (nm) is a particle size of 40 to 300 nano meters measured by dynamic light-scattering method and $D_2$ (nm) is a particle size measured by a nitrogen gas-adsorbing method, having an elongated shape elongated in only one plane and having a uniform thickness along the elongation within the range of from 5 to 20 nano meters as observed with an electron microscope, can be prepared by the following (a), (b) and (c).

(a) mixing an aqueous solution containing a water-soluble calcium salt or magnesium salt or a mixture of said calcium salt and said magnesium salt with an aqueous colloidal liquid of an active silicic acid containing from 1 to 6% by weight of $SiO_2$ and having a pH in the range of from 2 to 5 in an amount of 1500 to 8500 ppm as a weight ratio of CaO or MgO or a mixture of CaO and MgO to $SiO_2$ of the active silicic acid;

(b) mixing an alkali metal hydroxide or a water-soluble organic base or a water-soluble silicate of said alkali metal hydroxide or said water-soluble organic base with the aqueous solution obtained in the step (a) in a molar ratio of $SiO_2/M_2O$ of from 20 to 200, where $SiO_2$ represents the total silica content derived from the active silicic acid and the silica content of the silicate and M represents an alkali metal atom or organic base molecule; and (c) heating at least a part of the mixture obtained in the step (b) to 60° C. or higher to obtain a heel solution, and preparing a feed solution by using another part of the mixture obtained in the step (b) or a mixture prepared separately in accordance with the step (b) to prepare a feed solution, and adding said feed solution to said heel solution while vaporizing water from the mixture during the adding step until the concentration of $SiO_2$ is concentrated to from 6 to 30% by weight.

The colloidal silica particles constituting the sol according to the present invention are substantially made from amorphous silica, but they may contain a slight amount of an oxide of calcium or an oxide of magnesium or both of them, normally, from 1500 to 10000 ppm thereof to $SiO_2$ as a weight ratio in the silica sol, due to the production process which unavoidably accompanies the oxides. In some cases, the silica particles may contain a slight amount of oxides of other polyvalent metals in addition to the oxide of calcium or the oxide of magnesium or both of them. The concentration of the additional oxides of a polyvalent metal and the calcium oxide or the magnesium oxide or the both of the calcium oxide and the magnesium oxide is from about 1500 to 15000 ppm in total to $SiO_2$ as a weight ratio in the silica sol. Said other polyvalent metals include a divalent metal such as strontium (Sr), barium (Ba), zinc (Zn), tin (Sn), lead (Pb), copper (Cu), iron (Fe), nickel (Ni), cobalt (Co), and manganese (Mn); a trivalent metal such as aluminum (Al), iron (Fe), chromium (Cr), yttrium (Y), and titanium (Ti); and a quadrivalent metal such as Ti, Zn, and Sn. The aqueous colloidal liquid of the active silicic acid for use in the step (a) is a liquid in which silicic acid and a polymer of silicic acid less than 3 nano meters in particle size co-exist, and can be obtained easily by a known process. A preferred aqueous colloidal liquid of an active silicic acid can be obtained by cation exchange treatment of a water-soluble silicate, for example, a diluted aqueous solution of water glass having a molar ratio of $SiO_2/M_2O$ of from 1 to 4.5 (M represents an alkaline metal atom). The aqueous colloidal liquid thus obtained contains 6% by weight or less of $SiO_2$ and has a pH of 5 or lower. Preferably, the liquid thus obtained contains from 1 to 6% by weight of $SiO_2$ and has a pH of from 2 to 5. The pH of the colloidal liquid can be easily adjusted within the preferred range by leaving over apart of the cations on subjecting the diluted aqueous water glass solution to the cation exchange treatment, or by adding a small amount of, for example, an alkali metal hydroxide or a water-soluble organic base into the aqueous colloidal liquid of the active silicic acid obtained by entirely or partially removing the cation from the diluted aqueous water glass solution. The aqueous colloidal liquid of the active silicic acid thus obtained is unstable and it readily undergoes gelation. Thus, the aqueous colloidal liquid preferably is used immediately after its preparation and it preferably contains no impurities which may accelerate the gelation. More preferred aqueous colloidal liquid of an active silicic acid can be obtained by passing a diluted aqueous solution of a commercially available sodium water glass having a molar ratio of $SiO_2/Na_2O$ of from about 2 to 4 through a hydrogen-type cation exchange resin.

In the step (a), a water-soluble calcium salt or magnesium salt or a mixture of said calcium salt and magnesium salt is added to the active silicic acid-containing aqueous colloidal liquid. The water-soluble calcium salt or magnesium salt or a mixture of said calcium salt and said magnesium salt is preferably added in the form of an aqueous solution. The amount of the calcium salt, the magnesium salt or the mixture of said calcium salt and said magnesium salt to be added is from 1500 to 8500 ppm by weight to $SiO_2$ in said active silicic acid-containing aqueous colloidal liquid. Addition of such salt is preferably carried out with stirring. Although not specifically defined, the mixing temperature may be 2° to 50° C. and the mixing time may be 5 to 30 minutes. As examples of the calcium salt and the magnesium salt to be added, there may be mentioned inorganic acid salts and organic acid salts of calcium and magensium such as calcium and magnesium chlorides, nitrates, sulfates, sulfamates, formates, and acetates. The calcium salts and magnesium salts may be used as a mixture thereof. The concentration of the aqueous solution of said salts to be added is not specifically limited, but it may be from 2 to 20% by weight or so. The active silicic acid-containing aqueous colloidal liquid may contain polyvalent metal components other than said calcium and magnesium components in addition to the calcium salt, the magnesium salt and the like to form more preferable silica sol. As examples of the polyvalent metals other than calcium and magnesium, there may be mentioned II-valent, III-valent and IV-valent metals such as strontium (Sr), barium (Ba), zinc (Zn), tin (Sn), lead (Pb), copper (Cu), iron (Fe), nickel (Ni), cobalt (Co), manganese (Mn), aluminum (Al), chromium (Cr), yttrium (Y), and titanium (Ti). The amount of the polyvalent metal components (other than Ca and Mg components) to be added to the colloidal liquid is preferably from 10 to 80% by weight to CaO and/or MgO, as their polyvalent metal oxides, when the amount of the calcium salt and/or the magnesium salt added to the step (a) is expressed in terms of the step (a) is expressed in terms of the corresponding amount of CaO and/or MgO.

When the above-mentioned polyvalent metal components still remain in the active silicic acid-containing aqueous colloidal liquid obtained by cation exchange treatment of the aforesaid aqueous solution of water glass, the polyvalent metal components are to be calculated into oxide and reckoned in the above-mentioned amount of from 10 to 80% by weight. The polyvalent metal components of the remainder are preferably added to the active silicic acid-containing aqueous colloidal liquid together with the calcium salt and/or magnesium salt in the form of water-soluble salts of the said polyvalent metals. As preferred examples of such polyvalent metal salts, there are mentioned inorganic acid salts and organic acid salts such as chlorides, nitrates, sulfates, sulfamates, formates and acetates. In addition, salts of zincares, stannates, aluminates, plumbates, and salts such as sodium aluminate or sodium stannate may also be used.

The above-mentioned calcium salts, magnesium salts, and polyvalent metal salts to be added are preferably uniformly mixed with the active silicic acid-containing aqueous colloidal liquid and in general, the salts are added in the form of an aqueous solution itself.

In the step (b), an alkali metal hydroxide or a water-soluble organic base or a water-soluble silicate of said alkali metal hydroxide or said water-soluble organic base is added to the aqueous solution obtained in the above-mentioned step (a). The addition is preferably effected as soon as possible immediately after the completion of the above-mentioned step (a), with stirring. Although not specifically limited, the temperature may be 2° to 50° C. or so and the time may be 5 to 30 minutes or so in the mixing procedure. It is preferred that an alkali metal hydroxide or a water-soluble organic base or the water-soluble silicate of said alkali metal hydroxide or said water-soluble organic base is uniformly mixed with the aqueous solution obtained in the step (a) and the former is added to the latter directly or in the form of an aqueous solution thereof. Usual alkali metal hydroxide includes, for example, sodium, potassium and lithium hydroxides. Usual organic base includes, for example, quaternary ammonium hydroxides such as tetraethanolammonium hydroxide, monomethyltriethanolammonium hydroxide and tetramethylammonium hydroxide; amines such as monoethanolamine, diethanolamine, triethanolamine, N,N-dimethylethanolamine, N-(β-aminoethyl-)ethanolamine, N-methylethanolamine, monopropanolamine, and morpholine as well as other basic nitrogen-containing organic compounds. As the water-soluble silicates of said compounds, there may be mentioned, for example, sodium silicate, potassium silicate, silicates of the quaternary ammoniums and silicates of the above-mentioned amines. In addition, aluminares, stannates, zincares and plumbates of alkali metals or organic bases may be used. These alkali metal hydroxides, organic bases, silicates, metal acid salts may be used as a mixture thereof. When the alkali metal atom of the alkali metal hydroxide or the molecule of the organic base is represented by "M", the amount of the alkali metal hydroxide or the organic base or the water-soluble silicate of said alkali metal hydroxide or said organic base to be added is from 20 to 200 moles, preferably from 60 to 100 moles, of $SiO_2$ to one mole of $M_2O$ where $SiO_2$ is the total silica content derived from the active silicic acid used in the step (a) and the silica content of the above-mentioned silicate. After the addition, the resulting liquid comes to have a pH value of from 7 to 10 or so. Preferably, the $SiO_2$ concentration of the mixture obtained in the step (b) is preferably in a range of from 1 to 6% by weight.

In the step (c), a part or the whole of the mixture obtained in the step (b) is heated to a temperature of 60° C. or higher, preferably in a range of from 80° to 100° C., to obtain a heel solution. The heating step can be effected either under a normal pressure or under a reduced pressure. Preferably, the pressure inside an reaction container is controlled as such that the heel solution may boil. The duration of heating the heel solution is not particularly limited, but preferably, the feed solution is added immediately after the heating temperature in question is reached, or is added after the heel solution is held for a duration of less than 1 hour at the temperature in question. Subsequently, a part of the mixed liquid prepared in the step (b) or a separately prepared mixed liquid according to the process of the step (b) as a feed solution is added into the heel solution while heating the heel solution under a normal pressure or a reduced pressure at a temperature of 60° C. or higher, preferably, in a temperature range of from 80° to 100° C. During the step of adding the feed solution, water is evaporated to conduct the concentration until $SiO_2$ concentration becomes from 6 to 30% by weight. By evaporating water during the addition of the feed solution, highly concentrated silica sol comprising particles having an elongated shape can be obtained at a high efficiency in a compact reaction container.

In the step (c), the feed solution is added as $SiO_2$ into the heel solution at a rate of from 1.0 to 500 parts by weight per hour, more preferably, at a rate of from 3.0 to 500 parts by weight per hour, to $SiO_2$ 100 parts by weight of the heel solution. The amount of the feed solution to be added into the heel solution can be varied during the step (c), or may be added at a constant rate within the predetermined amount. Thus, the feed solution is added into the heel solution over a duration of from 0.2 to 100 hours, preferably, over a duration of from 0.5 to 40 hours. The weight of the feed solution to be added in this step (c) is preferably controlled as such that it may be related to the weight of the water evaporated in such a manner that the ratio of "the weight of the water evaporated" to "the weight of $SiO_2$ in the added feed solution" may fall in a range of from 10.3 to 125, preferably, in a range of from 12.8 to 107. This ratio can be controlled within the above-mentioned range or can be set at a constant value during the step (c) by controlling the pressure and the temperature. In the step (c), by setting the weights of the heel solution, the feed solution and the water to be removed by evaporation to the above-described conditions, the growth of particles and the concentration can be effected in parallel in a compact reaction container without using a large-sized reaction container to effectively prepare elongated-shaped silica sol concentrated at high concentration even in the production of commercial scale. The $SiO_2$ concentration of the feed solution to be added may be different from that of the heel solution as long as it falls within the range of the scope of the present invention. Similarly, the amount of the water-soluble calcium salt or the magnesium salt or a mixture of the water-soluble calcium salt and magnesium salt, as well as the amount of the alkali metal hydroxide or the water-soluble organic base or the water-soluble silicates of said alkali metal hydroxide or said water-soluble organic base may be different from that of the heel solution as long as it falls within the scope of the present invention. The heel solution in the step (c) is preferably stirred during the heating. However, stirring is unnecessary as long as the heel solution continues boiling. By this heating and concentration, elongated-shaped colloidal silica particles each having an elongated shape elongated in only one plane and having an almost uniform thickness along the elongation within the range of from 5 to 20 nano meters and each having particle size of 40 to 300 nano meters as measured by dynamic light-scattering method are formed in the liquid medium, so that the obtained liquid becomes silica sol having an $SiO_2$ concentration of from 6 to 30% by weight.

The method of measuring the particle size ($D_1$ nm) by dynamic light-scattering method in the present invention is explained in detail in Journal of Chemical Physics, Vol. 57, No. 11 (December, 1972), page 4814. For instance, the particle size may easily be determined by the use of a commercially available apparatus $N_4$ (sold by Coulter Co., U.S.A.) for dynamic light-scattering method. The particle size ($D_2$ nm) as calculated from the formula of $D_2=2720/S$ (where S means a specific surface area ($m^2/g$) of the particles to be measured by a conventional BET method (nitrogen gas-adsorbing method)), means the diameter of the suppositional spherical colloidal silica particles having the same specific surface area $S(m^2/g)$ as that of the elongated colloidal silica particles. Accordingly, the ratio $D_1/D_2$ of the particle size ($D_1$ nm), as measured by the aforesaid dynamic light-scattering method, to the particle size ($D_2$ nm) as measured by the BET method represents the elongation degree of the elongated-shaped colloidal silica particles. The silica sol produced by the method according to the present invention has a $D_1/D_2$ ratio of 5 or more.

The silica sol obtained in the step (c) can be further concentrated as long as the stability of the sol is not impaired. The sol can be concentrated, for instance, using a ultrafiltration (UF) membrane or by means of evaporation.

The silica sol thus obtained in the step (c) has a viscosity of from several centipoise (cp) to 500 cp or so, as measured at room temperature, and a pH value in the range of from 8.5 to 11. The silica sol contains alkali metal ions, and/or organic bases in an amount of molar ratio of $SiO_2/M_2O$ (where M has the same meaning as defined above) of from 20 to 200 and additionally contains calcium or magnesium and optionally the above-mentioned polyvalent metals in an amount of from 1500 to 15000 ppm or so of their oxides to $SiO_2$.

The silica sol thus obtained by the method according to the present invention is finally and irreversibly converted into a gel by removing water therefrom. Although silica sol is an alkaline aqueous silica sol, it may be converted into an acidic aqueous silica sol by cation exchange treatment thereof. Furthermore, when a different alkaline aqueous silica sol is added to the resulting acidic aqueous silica sol, another alkaline aqueous silica sol which is different from the above-mentioned alkaline aqueous silica sol can be obtained. The acidic aqueous silica sol is preferred to have a pH value of 2 to 4.

From the acidic aqueous silica sol an aqueous silica sol comprising a positively charged colloidal silica particle can be obtained by a conventional method. Namely, basic aluminum chloride, basic aluminum acetate, basic zirconium nitrate or a mixture of two or more thereof is added to the acidic aqueous silica sol at such an amount that the molar ratio $Z/SiO_2$ (where Z represents aluminum or zirconium atom) may fall within a range of from 0.01 to 10 and mixed to obtain an aqueous silica sol comprising positively charged colloidal silica particles having a pH in the range of from 2 to 6. Furthermore, organo silica sol can be obtained from the aqueous silica sol above by substituting for the water of the medium thereof an organic solvent by a conventional method, for example, a distillation substitution method.

All of the acidic aqueous silica sol, the aqueous silica sol comprising positively charged particles and the organo silica sol still have shape of those already formed in the step (c), and those sols are finally and irreversibly converted into gels by removal of the medium therefrom.

Each of the aqueous alkaline silica sol, aqueous acidic silica sol or aqueous silica sol comprising positively charged colloidal silica particles as prepared in accordance with the present invention can be mixed with any other conventional sol(s), thereby to obtain a stabilized sol. Regarding the organo sol of the present invention, it may also mixed with any another conventional sol(s) to obtain a stabilized sol, provided that the solvents in the sols to be mixed are compatible with each other so as not to cause coagulation of the colloidal silica in the mixed sol.

DETAILED DESCRIPTION OF THE INVENTION

Figure 1:
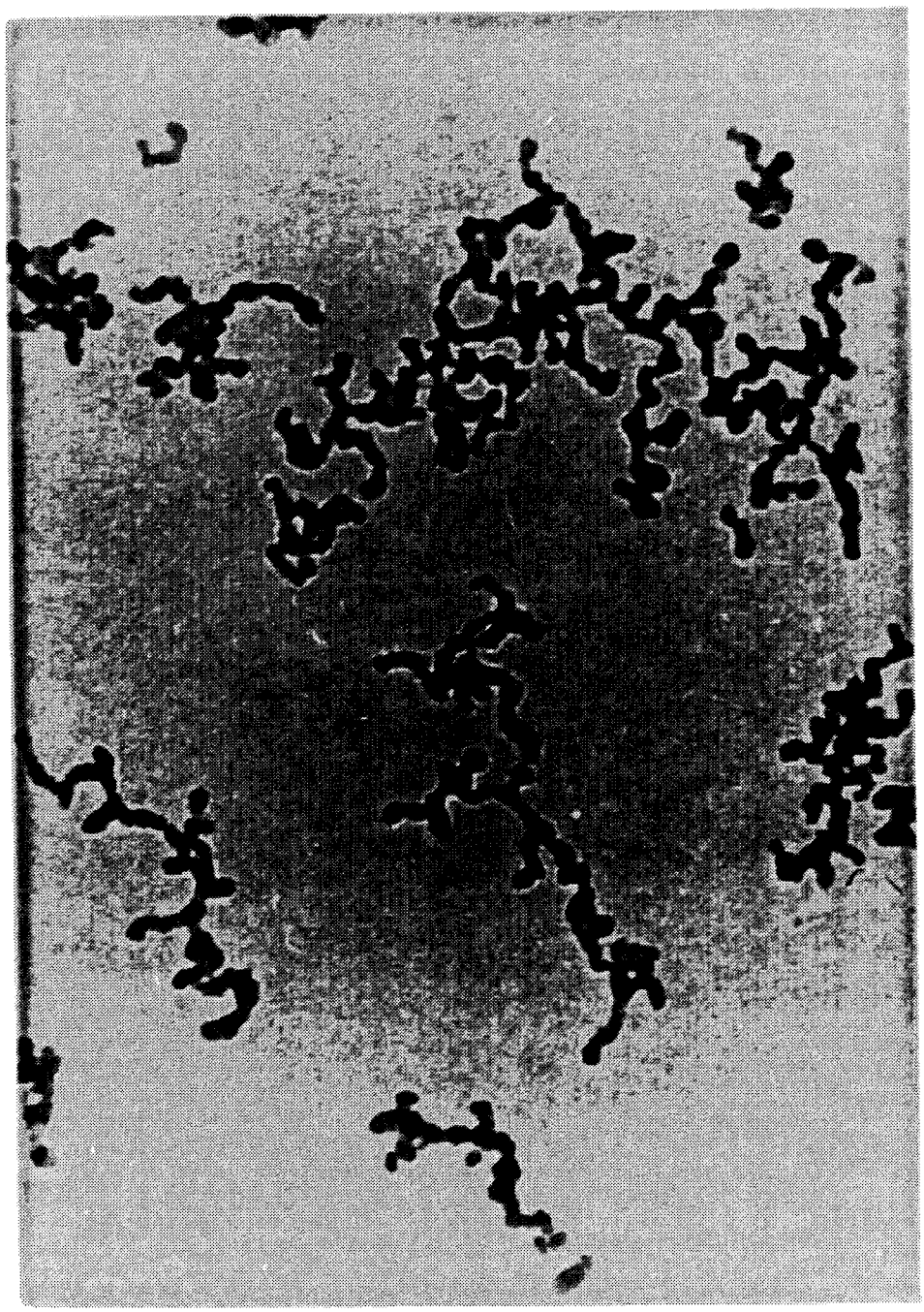
FIG. 1 is an electron micrograph taken at a magnification of 200,000 times, showing the particle structure of a silica sol particle having an elongated shape obtained by the method according to an embodiment of the present invention.

The colloidal silica particles in the sol prepared by the method of the present invention have elongation in only one plane and a uniform thickness of from 5 to 20 nm along the elongation with a degree of elongation of 5 or more in terms of the ratio of $D_1/D_2$ and have a particle size $D_1$ of from 40 to 300 nm as measured by dynamic light-scattering method. Although it is difficult to completely clarify the mechanism of forming the colloidal silica particles, the following could be presumed.

First, in the step (a), when a water-soluble calcium salt or a water-soluble magnesium salt or a mixture of said calcium salt and said magnesium salt is added to the active silicic acid colloid-containing aqueous liquid, the calcium ions and/or the magnesium ions are captured by the active silicic acid particles. Next, in the step (b), when an alkali metal hydroxide or an organic base or a silicate of said alkali metal hydroxide or said organic base is added to the resulting aqueous solution formed in the step (a), a part of the active silicic acid particles, which have captured the calcium ions and/or magnesium ions therewith, would be chain-like coagulated in tying in a row thereby forming string-like elongated coagulated particles which might be angled in any direction. In the string-like coagulated particles, the elongation may not be in only one plane or there may partially be a three-dimensional network structure. Next, in the step (c), when, first, the mixed liquid which becomes the heel solution is heated, the active silicic acid particles are polymerized and the above-mentioned long string-like coagulated particles are cleaved, whereupon the three-dimensional network structure would be broken into fragments of a certain length, probably from 10 to 100 nm or so, and the already captured calcium ions and/or magnesium ions would thereby react on the thus broken fragments and also on the coagulated particles having a short length so that the elongation of fragments and the short string-like particles would be settled so as to exist only in one plane. When a part of the mixed solution obtained in the step (b) or a separately prepared mixed solution according to the method of the step (b) is further added as a feed solution to the heel solution above and continuously heated, particles similar to the particles of the above-mentioned fragment and having the above-mentioned short length, which are derived from the added feed solution feed are newly formed. The newly formed particles, as well as the previously formed fragmented and short length particles existing in the heel solution, function as nuclei for forming the colloidal silica particles having the elongated shape in the sol prepared by the present invention. The continuous heating in the step (c) causes precipitation of the silicic acid dissolved in the liquid or the silicic acid dissolved from the easily soluble parts of the broken fragments onto the surface of the said fragments one by one, whereby the thickness of the fragments may be enlarged. During this growth of the particles, water is evaporated and concentration is conducted. As a result of the sequence of the process, colloidal silica particles which have an almost uniform thickness of from 5 to 20 nm along the elongation and have been extended in only one plane with a length of from 40 to 300 nm or so are formed in the colloidal liquid after the completion of the step (c). The present invention has been accomplished by finding that a stable concentrated sol comprising particles having a specified elongated particle shape can be obtained even from a highly concentrated solution containing $SiO_2$ at a concentration of more than 6% by weight.

When the alkali metal hydroxide or the organic base or water-soluble silicate of said alkali metal hydroxide or said organic base to be used in the step (b) is first added to the active silicic acid-containing aqueous colloid liquid to be used in the step (a) and then an aqueous solution of the calcium salt or the magnesium salt or the mixture of said calcium salt and said magnesium salt to be used in the step (a) is thereafter added to the resulting mixture, rapid gelation occurs so that the resulting mixture can hardly be dispersed by a conventional stirring means, so that the uniform heating and the addition of the mixed liquid in the step (c) becomes impossible. Further, even if the thus formed gel is heated and further the above-mentioned gel is added and continuously heated, the colloidal silica particles having the abovementioned shape of the present invention can no longer be obtained.

In the step (a), when the $SiO_2$ concentration of the active silicic acid-containing aqeuous colloidal liquid to be used is less than 1% by weight, removal of a large amount of water is required in concentration of the sol formed in the step (c) or in a step which is optionally conducted after the step (c). Removal of such a large amount of water in a subsequent step is inefficient. On the other hand, when the $SiO_2$ concentration of the active silicic acid-containing aqueous colloid liquid is more than 6% by weight, the liquid lacks its extreme stability so that a sol having a regular quality can hardly be produced. Accordingly, the $SiO_2$ concentration is preferably within the range of from 1 to 6% by weight. Among the active silicic acid-containing aqueous colloidal liquids having such $SiO_2$ concentration, those having a pH value of from 2 to 5 are further preferred. When the pH value is higher than 5, the stability of the active silicic acid-containing aqueous liquid is insufficient, and the colloidal silica particles in the sol obtained by the step (c) can not have the above-mentioned elongated shape. The pH value may be lower than 2, if desired, but such lower pH value is unfavorable since not only addition of any acids is required but also the amount of the unnecessary anions increases in the products.

In the step (a), when a calcium salt or magnesium salt or a mixture of calcium salt and magesium salt is added to the active silicic acid-containing aqueous colloidal liquid in the form of an aqueous solution of the salt, uniform mixing of the resulting mixture may easily be attained. The uniform mixing is important for facilitating the uniform capture of the added calcium ion and/or magnesium ion by the silicic acid.

Of the active silicic acid-containing aqueous colloidal liquids to be used in the step (a), one obtainable by cation exchange treatment of an aqueous solution of a water-soluble silicate contains almost no dissolved or free cation in the liquid. Of the water-soluble silicate to be used, an inexpensive and easily available water glass is preferred. A water-soluble silicate obtainable by dissolving a silica obtained by hydrolysis of a silicon halide or alkoxysilane in an alkali has a low content of impurities, especially polyvalent metals, but it is expensive. As opposed to this, a water glass as a general industrial product contains polyvalent metals generally in an amount of several thousands ppm or less as the oxides thereof to the silica content therein. When an aqueous solution of such water glass is subjected to cation exchange treatment, all the said polyvalent metal content can not be removed. Accordingly, the resulting active silicic acid-containing aqueous colloidal liquid generally contains the remaining polyvalent metal oxides in an amount of about 5000 ppm or less. But since the oxides are captured by the active silicic acid in the liquid or by the fine polymer particles through chemical bond with silica or adsorption thereto, the liquid contains neither dissolved polyvalent metal cations nor free polyvalent metal cations therein. The remaining polyvalent metal components are reckoned in the polyvalent metal components to be used together with the calcium salt and/or magnesium salt in the step (a) as a part thereof, and therefore, these act in the same manner as the polyvalent metal salts to be used together with the calcium salt and/or magnesium salt in the step (a).

When the amount of the calcium salt or magnesium salt or a mixture of calcium salt and magnesium salt to be added in the step (a) is less than 1500 ppm by weight as CaO or MgO or both of them to $SiO_2$ of the active silicic acid, the shape of the finally obtainable colloidal silica particles is spherical or cocoonlike. On the other hand, when it is more than 8500 ppm, the colloidal silica particles having the particular shape of the invention can not be formed by the step (c). Accordingly, it is believed that the CaO, MgO or both of them in amount of from 1500 to 8500 ppm substantially effects the formation of the particles of the present invention. Some of the above-mentioned polyvalent metal components to be used together with the calcium salt and/or magnesium salt have a function of accelerating the formation of the colloidal silica particles or some others of them have a function of retarding the formation of the particles. When the amount of such additional polyvalent metal components to be used is more than about 80% by weight of the oxides thereof to CaO and/or MgO, the active silicic acid-containing aqueous colloidal liquid will thereby be gelled.

After addition and mixing of the calcium salt and/or magnesium salt and optionally other metal salts in the above-mentioned step (a), the alkali metal hydroxide or organic base or silicate of said alkali metal hydroxide or organic base is immediately added to the resulting liquid as soon as possible in the step (b) so that the active silicic acid particles in the liquid may not vary unfavorably. The addition of such alkaline substances is also effected directly or as an aqueous solution of the substance having a concentration of from 5 to 30% or so by weight, preferably with stirring, so as to facilitate the uniform mixing of the resulting liquid.

In the step (b), when the amount of the alkaline substances to be added is less than 20 as a molar ratio of the said $SiO_2/M_2O$, the particles can not grow by heating in the subsequent step (c). On the contrary, when the molar ratio is more than 200, the particles can not also grow by heating in the step (c) but the sol will be gelled by such heating. Accordingly, addition of the said alkaline substances in an amount of from 20 to 200, preferably from 60 to 100, as the molar ratio of $SiO_2/M_2O$, followed by heating of the resulting mixture in the subsequent step (c) gives the intended colloidal silica particles having the size and the shape as specifically defined in the present invention. Addition of the alkaline substances in the step (b) is desired to be effected at a possibly lower temperature, preferably at room temperature, so that the stirring of the resulting mixture may easily be conducted. When the heating temperature in the step (c) is lower than 60° C., the intended colloidal silica particles of the present invention cannot be formed, and therefore it is required to be 60° C. or higher, preferably 80° C. to 100° C.

EXAMPLE 1

Water was added to a commercial JIS No. 3 sodium silicate (molar ratio of $SiO_2/Na_2O$: 3.21, $SiO_2$ content: 29.2% by weight) to prepare an aqueous sodium silicate solution having an $SiO_2$ concentration of 3.3% by weight. The aqueous sodium silicate solution was passed through a column filled with a hydrogen-type cation exchange resin (trade name of Amberlite 120B), to obtain an active silicic acid-containing aqueous colloidal liquid having an $SiO_2$ concentration of 3.2% by weight, a pH value of 2.88 and an electroconductivity of 711 μ S/cm. The liquid contained $Al_2O_3$ and $Fe_2O_3$ as remained therein in a total amount of 71 ppm.

4450 g of the active silicic acid-containing aqueous colloidal liquid was put in a glass container and then 26.7 g of aqueous 10 wt. % calcium nitrate solution was added thereto with stirring at room temperature. After 30 minutes, 31.6 of aqueous 10 wt. % sodium hydroxide solution was added thereto with stirring at room temperature. The thus obtained mixture had a pH value of 8.02 and a molar ratio of $SiO_2/Na_2O$ of 60. Then, 1500 g of a portion from the mixture was charged inside a separable glass flask and was heated to 100° C. to obtain a heel solution. The remaining mixture which amounted to 3008 g was added into the heel solution at a rate of 84 g per 1 hour as a feed solution while evaporating the resulting mixture at such a rate that water vapor of 84 g per 1 hour might be discharged from the separable flask to maintain the liquid face of the solution at a constant level. The addition of the mixture to the heel solution was completed in about 36 hours, and water was added thereafter over one hour at the same rate as that used in adding the feed solution. Thus was obtained a silica sol having a specific gravity of 1.060, 9.5% by weight of $SiO_2$ concentration, a pH value of 9.90, a viscosity of 9 cp at 20° C., a molar ratio (by titrimetric method) of $SiO_2/Na_2O$ of 75, 608 ppm of CaO content by weight in the obtained silica sol and an electro-conductivity of 3575 μ S/cm. From the electron-microscopic photograph, the colloidal silica particles in the sol were found to be elongated particles having a thickness of 12 nm. The particle size of the collodial silica particles in the sol was 119 nm, as measured by dynamic light-scattering method. The particle size of the dynamic light-scattering method was determined by using $N_4$ apparatus manufactured by Coulter Co. in U.S.A. The colloidal silica particle size was calculated to be 12 nm by BET method. The silica sol was concentrated in an ultrafiltration apparatus to give a concentrated silica sol having an $SiO_2$ concentration of 15.3% by weight. The obtained silica sol has a specific gravity of 1.100, a pH value of 9.85, a viscosity of 28 cp, a molar ratio (by titrimetric method) of $SiO_2/Na_2O$ of 77, 972 ppm of CaO content by weight in the obtained silica sol and an electroconductivity of 3620 μ S/cm. The concentrated sol was stored in a closed vessel at 60° C., resulting in no deterioration even after one month.

FIG. 1 shows an electro-microscopic photograph of colloidal silica particles of this silica sol.

EXAMPLE 2

4180 g of the active silicic acid-containing aqueous colloidal liquid ($SiO_2$ concentration: 3.2% by weight and pH: 2.88) in Example 1 was put in a glass container, and 27.4 g of aqueous 10 wt. % calcium nitrate solution was added thereto with stirring at room temperature. Thirty minutes after the addition of the aqueous 10 wt. % calcium nitrate solution, 29.7 g of an aqueous 10 wt. % sodium hydroxide solution was added at room temperature with stirring, to give 4237 g of a mixture having a pH of 8.21 and a molar ratio of $SiO_2/Na_2O$ of 60.

1500 g of a portion of the resulting mixture was charged inside a glass separable flask and was heated to 80° C. while reducing the inner pressure of the container to about 355 mmHg using an aspirator to obtain a heel solution. The remaining mixed solution which amounted to 2737 g was added into the boiling heel solution at 80° C. and at a rate of 171 g per hour as a feed solution and at the same time, water vapor of 171 g per hour were discharged from the separable flask to maintain the liquid face of the solution at a constant level. After continuing the addition of the mixture to the heel solution for about 16 hours, water was added in place of the feed solution at the same rate as that used in adding the feed solution while heating for another 1 hour. Thus was obtained a silica sol having a specific gravity of 1.053, 8.9% by weight of $SiO_2$ concentration, a pH of 9.42, a viscosity of 7 cp at 20° C., a molar ratio (by titrimetric method) of $SiO_2/Na_2O$ of 76, 622 ppm of CaO content by weight in the obtained silica sol and an electroconductivity of 3805 μ S/cm. From an electron-microscopic photograph, the colloidal silica particles in the silica sol were found to be an elongated particles having a thickness of 9 nano meters. The particle size of the colloidal silica particles in the sol was 97.5 nano meters, as measured by dynamic light-scattering method. The colloidal silica particle size was calculated to be 9 nano meters by BET method.

The silica sol was concentrated in an ultrafiltration apparatus to give a concentrated silica sol having an $SiO_2$ concentration of 16.7% by weight. The silica sol thus obtained has a specific gravity of 1,112, a pH of 9.34, a viscosity of 21 cp, a molar ratio (by titrimetric method) of 78, 1156 ppm of CaO content by weight in the obtained silica sol and an electroconductivity of 3620 μ S/cm. The silica sol was sealed airtight, and was preserved at 60° C. for a duration of 1 month to find no deterioration to occur on the silica sol was found to occur.

The elongated-shaped silica sol obtained by the method of the present invention has an improved property and is superior to any conventional spherical silica sol in various uses. Uses of the present silica sol include, for example, materials for coating compositions such as inorganic coating compositions, heat-resistant coating compositions, and anti-corrosive coating compositions; as impregnating agents of inorganic fibers such as glass fibers, ceramic fibers; surface-treating agents for concretes, mortars, cements, fiber products, papers, wood, and the like; sealants; catalyst carrier components; adsorbent components; and the like. By using elongated-shaped silica sol having high concentration according to the present invention in these uses, products with improved performance can be obtained and the process step can be shortened.

The highly concentrated elongated-shaped silica sol according to the present invention can be prepared with high efficiency and high stability by evaporating water in the solvent and conducting the concentration and at the same time, growing particles. According to the present invention, the time required in the concentration step and energy can be laborsaved.

What is claimed is:

1. A method of preparing a stable alkaline aqueous silica sol having an $SiO_2$ concentration of from 8.9 to 30% by weight, and having elongated-shaped amorphous colloidal silica particles each having at least 5 as a ratio of $D_1/D_2$ where $D_1$ (nm) is a particle size of 40 to 300 nano meters measured by a dynamic light-scattering method and $D_2$ (nm) is a particle size measured by a nitrogen gas-adsorbing method, having an elongated shape elongated in only one plane and having a uniform thickness along the elongation within the range of from 5 to 20 nano meters, as observed with an electron microscope, comprising the following steps (a), (b) and (c):

(a) mixing an aqueous solution containing a water-soluble calcium salt or magnesium salt or a mixture of said calcium salt and magnesium salt with an aqueous colloidal liquid of a silicic acid containing from 1 to 6% by weight of $SiO_2$ and having a pH in the range of from 2 to 5 in an amount of 1500 to 8500 ppm as a weight ratio of CaO or MgO or a mixture of CaO and MgO to $SiO_2$ in the silicic acid;

(b) mixing an alkali metal hydroxide or a water-soluble organic base or a water-soluble silicate of said alkali metal hydroxide or said water-soluble organic base with the aqueous solution obtained in the step (a) in a molar ratio of $SiO_2/M_2O$ of from 20 to 200, where $SiO_2$ represents the total silica content derived from the silicic acid and the silica content of the silicate and M represents the alkali metal atom or organic base molecule; and (c) heating at least a part of the mixture obtained in the step (b) to 60° C. or higher to obtain a heel solution, and preparing a feed solution by using another part of the mixture obtained in the step (b) or a mixture prepared separately in accordance with the step (b) to prepare a feed solution, and adding said feed solution to said heel solution while vaporizing water from the mixture during the adding step until the concentration of $SiO_2$ is concentrated to from 8.9 to 30% by weight.

2. A method as claimed in claim 1, wherein the water-soluble salt of calcium or magnesium for use in the step (a) is at least one selected from the group consisting of calcium chloride, magnesium chloride, calcium nitrate, magnesium nitrate, calcium sulfamate, magnesium sulfamate, calcium formate, magnesium formate, calcium acetate, magnesium acetate, and a mixture thereof.

3. A method as claimed in claim 1, wherein the metal hydroxide for use in the step (b) is at least one selected from the group consisting of sodium hydroxide, potassium hydroxide, lithium hydroxide, and a mixture thereof.

4. A method as claimed in claim 1, wherein the water-soluble organic base for use in the step (b) is selected from the group consisting of an organic compound containing a quaternary ammonium hydroxide, an amine, an organic compound containing a basic nitrogen atom, and a mixture thereof.

5. A method as claimed in claim 4, wherein the quaternary ammonium hydroxide for use in the step (b) is at least one selected from the group consisting of tetraethanolammonium hydroxide, monomethyltriethanolammonium hydroxide, tetramethylammonium hydroxide, and a mixture thereof.

6. A method as claimed in claim 4, wherein the amine for use in the step (b) is at least one selected from the group consisting of monoethanolamine, diethanolamine, triethanolamine, N,N-dimethylethanolamine, N-(β-aminoethyl)ethanolamine, N-methylethanolamine, monopropanolamine, morpholine, and a mixture thereof.

7. A method as claimed in claim 1, wherein the water-soluble silicate for use in the step (b) is at least one selected from the group consisting of sodium silicate, potassium silicate, quaternary ammonium silicate, amine silicate, and a mixture thereof.

8. A method as claimed in claim 1, wherein in the step (b), a metal salt of an acid is added either alone or in combination with a hydroxide of an alkali metal, a water-soluble organic base or a water-soluble silicate at molar ratio of $SiO_2/M_2O$ of from 20 to 200, where $SiO_2$ represents the total silica content of silica derived from said active silicic acid and that of said silicate and M represents an atom of said alkali metal or a molecule of said organic base.

9. A method as claimed in claim 8 wherein the metal salt of an acid for use in the step (b) is at least one selected from the group consisting of aluminares, stannates, zincates, plumbates and a mixture thereof of an alkali metal or an organic base.

10. A method as claimed in claim 1, wherein the heel solution in the step (c) is heated in a temperature range of from 80° to 100° C.

11. A method as claimed in claim 1, wherein the feed solution in the step (c) is added over a duration of from 0.5 to 40 hours.

12. A method as claimed in claim 1, wherein in the step (c), the ratio by weight of the water evaporated to the $SiO_2$ quantity of the feed solution to be added is in the range of from 10.3 to 125.

13. A method of preparing a stable acidic aqueous silica sol, said method comprising:
    preparing an alkaline aqueous silica sol according to the method of claim 1;
    subjecting said alkaline aqueous silica sol to cation exchange treatment to provide a stable acidic aqueous silica sol having a pH of 2 to 4.

14. The method according to claim 13, further comprising:
    mixing with said acidic aqueous silica sol having a pH of 2 to 4, at least one compound selected from the group consisting of a basic aluminum chloride, a basic aluminum acetate, a basic zirconium nitrate, and a mixture thereof at molar ratio of $N/SiO_2$ of 0.01 to 10 where N represents aluminum atom or zirconium atom, to provide a stable aqueous silica sol having a pH of 2 to 6.

15. A method of preparing a stable organo silica sol, said method comprising:
    preparing an alkaline aqueous silica sol according to the method of claim 1;
    subjecting said alkaline aqueous silica sol to cation exchange treatment; and
    replacing water of the aqueous silica sol with an organic solvent to provide a stable organo silica sol.

16. A method according to claim 15, further comprising:
    adding to said cation-exchanged acidic aqueous silica sol, at least one compound selected from the group consisting of a basic aluminum chloride, a basic aluminum acetate, a basic zirconium nitrate, and a mixture thereof at molar ratio of $N/SiO_2$ of 0.01 to 10 wherein N represent aluminum atom or zirconium atom.

* * * * *